United States Patent [19]

Sween et al.

[11] Patent Number: 5,545,335

[45] Date of Patent: Aug. 13, 1996

[54] WATER PURIFIER

[75] Inventors: Adrian P. Sween, 205 Maryknoll Dr., Stillwater, Minn. 55082; Raymond D. Nass, Stevens Point, Wis.

[73] Assignee: Adrian P. Sween, Stillwater, Minn.

[21] Appl. No.: 312,328

[22] Filed: Sep. 26, 1994

[51] Int. Cl.⁶ ............................ C02F 1/32; C02F 1/50; A61H 33/00

[52] U.S. Cl. .................. 210/748; 210/764; 210/85; 210/169; 210/199; 210/416.2; 4/541.3; 4/559; 422/24; 422/186.3; 134/29

[58] Field of Search .................. 210/748, 764, 210/805, 85, 169, 195.1, 199, 258, 259, 416.2; 422/24, 186.3; 4/490, 541.1, 541.3, 559, 602; 134/29

[56] References Cited

U.S. PATENT DOCUMENTS

| | | |
|---|---|---|
| 2,889,275 | 6/1959 | Moore . |
| 3,540,592 | 11/1970 | Derreumaux ............... 210/169 |
| 4,069,153 | 1/1978 | Gunther . |
| 4,141,830 | 2/1979 | Last . |
| 4,179,616 | 12/1979 | Coviello et al. . |
| 4,230,571 | 10/1980 | Dadd . |
| 4,390,432 | 6/1983 | Takeguchi et al. ............ 210/748 |
| 4,676,894 | 6/1987 | Diamond et al. ............ 210/416.2 |
| 4,769,131 | 9/1988 | Noll et al. ................... 210/85 |
| 4,804,478 | 2/1989 | Tamir ......................... 210/199 |
| 4,868,934 | 9/1986 | Altman ....................... 4/490 |
| 4,995,123 | 2/1991 | Kern ........................... 4/490 |
| 5,032,292 | 7/1991 | Conrad ....................... 210/764 |
| 5,178,755 | 1/1993 | LaCrosse . |
| 5,266,215 | 11/1993 | Engelhard . |
| 5,268,104 | 12/1993 | Masoomain . |
| 5,290,439 | 3/1994 | Buchwald .................. 210/748 |
| 5,352,359 | 10/1994 | Nagai et al. ................ 422/24 |

FOREIGN PATENT DOCUMENTS

1-97459   4/1989   Japan .......................... 4/559

OTHER PUBLICATIONS

"Hospital hydrotherapy pools treated with ultra violet light: bad bacteriological quality and presence of thermophilis *Naegleria*", by J. F. DeJonckheere, *J.Hyg. Camb.*, (1982), 88 pp. 205–214.

"Ultraviolet Light as a Sterilization Method in Flotation Tanks", by Glenn K. Y. Wong and Peter Suedfeld, *Journal of Clinical Engineering*, vol. 11, No. 1, Jan/Feb, 1986, pp. 69–72.

"Applications for Ultraviolet", by Ann M. Wysocki, *Water Conditioning & Purification Magazine*, May 1988.

"Ultraviolet Water Purification", by John G. Mone, *Pollution Engineering Magazine*, vol. 5, No. 12, Dec. 1973.

"Bacteriological Efficacy Testing of the Aquazone Us–150", prepared for: Aquazone Products, Apr. 30, 1982, Aqualab Inc., pp. 19–23.

"Ultra–Hyd™ Germicidal Ultraviolet Water Purifiers", Ultra–Hyd, 361 Easton Rd., Horsham, PA 19044. Advertising material.

"Mighty Pure™ Ultraviolet Water Purifiers" Atlantic Ultraviolet Corporation, pp. 1–8. Advertising material.

"American Ultraviolet Company, Ultraviolet Water Disinfection Equipment, Industrial Applications". Advertising material.

(List continued on next page.)

*Primary Examiner*—Peter A. Hruskoci
*Assistant Examiner*—Theodore M. Green
*Attorney, Agent, or Firm*—Merchant, Gould, Smith, Edell, Welter & Schmidt

[57] ABSTRACT

A system for purifying and recirculating water in a tub during the course of a bath. The system includes an apparatus comprising a pump in communication with a suction port. The pump is in communication with one end of a disinfecting unit. The disinfecting unit includes a mechanism for disinfecting the water with ultraviolet radiation and structure for enhancing the turbulence in the water, to further inhibit bacteria growth. The second end of the disinfecting unit attaches to structure for delivering the treated water to the tub.

8 Claims, 7 Drawing Sheets

OTHER PUBLICATIONS

"American Ultraviolet Company, Ultraviolet Water Disinfection Equipment Light Commercial/Industrial Applications". Advertising material.

"Effect of Ultra–Violet Irradiation on Bacterial Numbers in Water Circulating in a Closed Circuit", by V. Fredette, *Canadian Journal of Public Health*, vol. 54, 1963, pp. 558–560.

"Disinfection of Circulating Water Systems by Ultraviolet Light and Halogenation", by Richard W. Gilpin, Susan B. Dillon, Patricia Keyser, Alice Androkites, Mary Berube, Nichola Carpendale, Jane Skorina, James Hurley and Adele M. Kaplan, *Water Res.*, vol. 19, No. 7, pp. 839–348, 1985.

WATER PURIFIER

FIELD OF THE INVENTION

The invention relates to water treatment devices, and in particular to a water purification device and method for continuously disinfecting bath water in a bathtub with ultraviolet radiation, and subsequent recirculation of the treated water to the bathtub during the course of a bath.

BACKGROUND OF THE INVENTION

Baths are commonly considered a place where infection and cross/auto infection occur. During bathing, bacteria counts rise due to the various germs the person (the bather) brings to the bathtub which contaminates the bath water during the time of the bath. For example, urine and fecal material brought into the bathtub from the person contain over one hundred potential viruses. Furthermore, the bacteria could be incubated by additives in the bath water and the bath water being at "incubator" temperatures. Additionally, bacteria from the hands of a worker bathing the person may also enter into the bath water.

Bacteria enter the bath water, where they are commonly transmitted to the bather or person assisting the bather, through cuts, sores, or scrapes on the skin, the water contacting the eyes, nose, mucous membranes, or aspiration into the lungs. The increased exposure to bacteria increases potential exposure of the bather and the person assisting with the bathing to urinary tract infections, staff, strep, influenza or other diseases.

Currently, harmful and potentially dangerous chemicals such as chlorine and BETADINE® are available to protect bathers against bacteria in the bath water. These chemicals are caustic to the skin and prolonged exposure to them can cause skin irritations such as dermatitis. Additionally, chemically disinfecting the bathtub prior to filling it with water has been shown to be of little utility. This was detailed in a 1985 study by the Medical College of Pennsylvania, where water samples taken after a patient bath showed a 500,000 fold increase in bacteria count when compared to a sample from the fresh water placed into the tub, which was chemically disinfected before the bath.

SUMMARY OF THE INVENTION

The present invention improves on the prior art by providing a water purification apparatus and method for continuously treating water in a tub during the course of a bath, keeping it substantially bacteria free throughout the bath. The apparatus comprises a pump in communication with a suction port. The pump is in communication with one end of a disinfecting unit. The disinfecting unit includes a mechanism for disinfecting the water with ultraviolet radiation and structure for enhancing the turbulence in the water, to further inhibit bacteria growth. The second end of the disinfecting unit attaches to structure for delivering the treated water to the ambient surroundings (i.e., the tub).

BRIEF DESCRIPTION OF THE DRAWINGS

The present invention will be described with reference to the accompanying drawings, wherein like reference numerals identify corresponding or like components.

In the drawings.

DETAILED DESCRIPTION OF THE DRAWINGS

Figure 1:
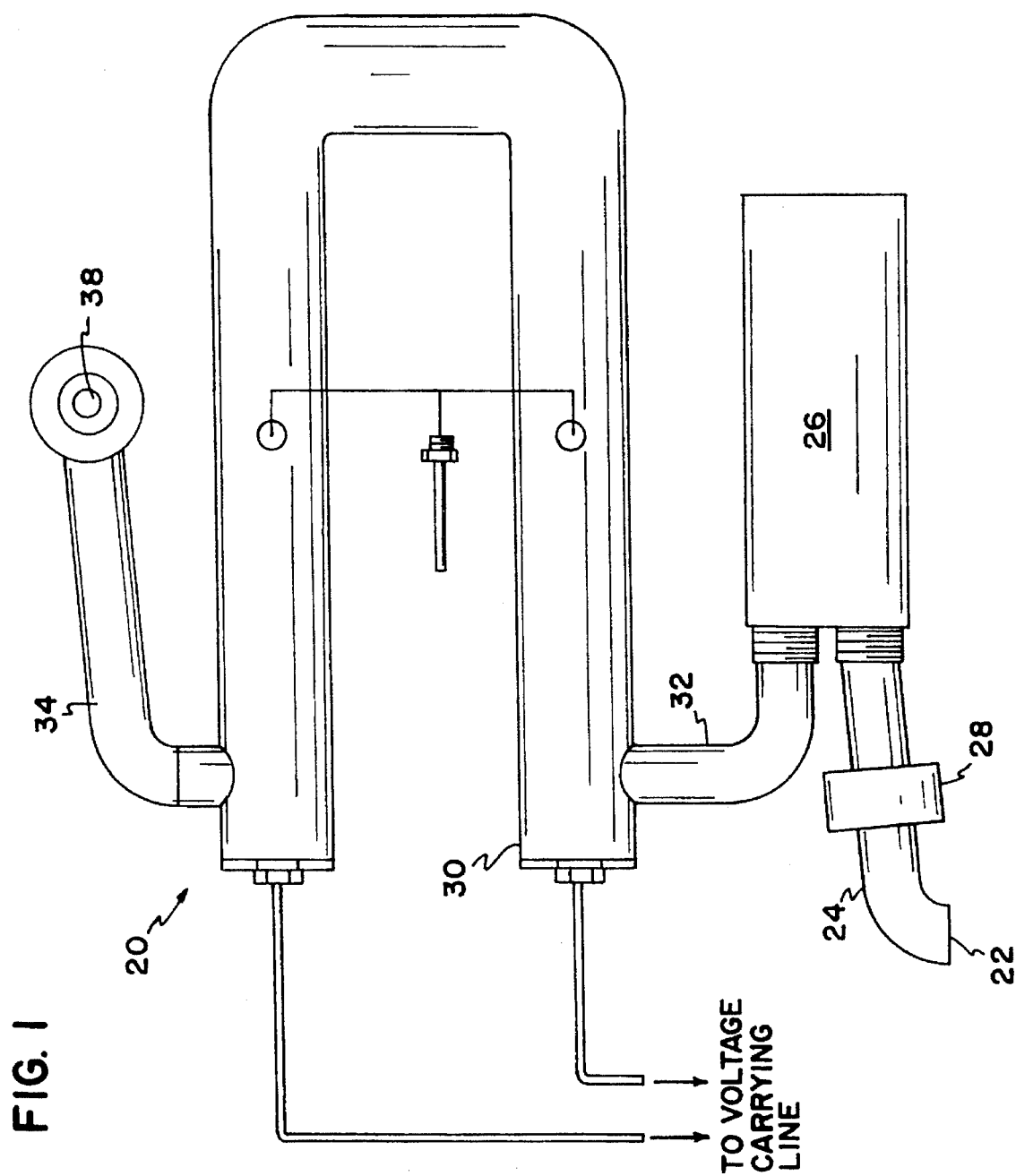
FIG. 1 is a side view of the preferred invention with the bathtub removed.

FIG. 1 shows the water purification apparatus 20 of the present invention. The apparatus 20 includes an inlet (suction) port 22 at the end of a conduit 24, which connects at the end opposite the inlet port 22 to a pump unit 26. A removable filter 28, such as a 1 micron filter, is located along the conduit 24, intermediate the inlet port 22 and the pump unit 26. This filter 28 may be eliminated altogether if so desired.

The pump unit 26 delivers bath water to the disinfecting unit 30 through an inlet carrier line 32. In the disinfecting unit 30, the bath water is treated, and returned to the bathtub 112 (FIG. 4a), through the outlet carrier line 34. The outlet carrier line 34 is preferably connected to the plumbing of the bathtub 112 (FIG. 4a), such that the treated water is returned into the bath through whirlpool jets 38, of the kind associated with conventional whirlpool tubs. While only one jet 38 is shown in FIG. 1, this is for illustrative and explanatory purposes only, as the outlet carrier line 34 can be branched into multiple sublines, to provide treated water to a plurality of jets, preferably three or four, as found in conventional tubs. For optimum operation, it is preferred that the inlet conduit 24 be at a lower elevation than the jets 38 in order to create a circulation path for the bath water.

Figure 5:
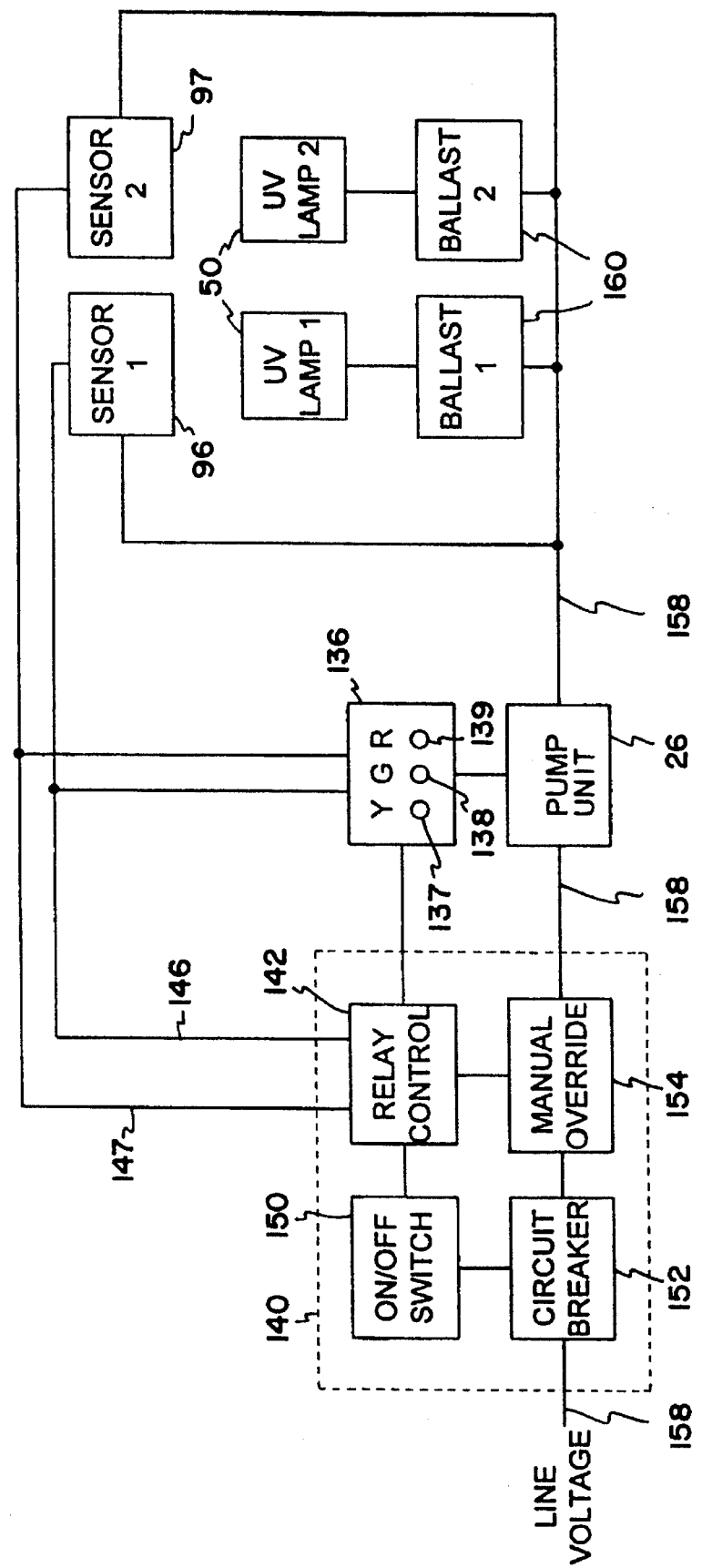
FIG. 5 is a block diagram of the electronics associated with the present invention.

The pump unit 26 includes an electric motor and a pump, and is capable of pumping at rates of approximately 40 gallons per minute. The pump is preferably a whirlpool pump, for creating a "whirlpool" water stream of sufficient turbulence, which moves the water particles as close as possible to the ultraviolet light bulbs 50 (FIG. 2) in the disinfecting unit 30, maximizing disinfection. This turbulence also inhibits germs and bacteria from growing within the system. The pump unit 26 is connected to an voltage carrying line 158 (FIG. 5) and activated by an on/off switch 150 (FIG. 5). The pump control unit 140 (FIG. 5) may also include a timer (not shown) for limiting the time the pump unit 26 is operating, thus controlling the time for each bath, for example, to approximately twelve minutes. The preferred pump unit 26 is either a one horsepower ULTRAFLOW or SUPERFLOW model pump from Vico Products Manufacturing Co., Inc., 1808 Potrero Avenue, South Elmonte, Calif. 91733.

Figure 2:
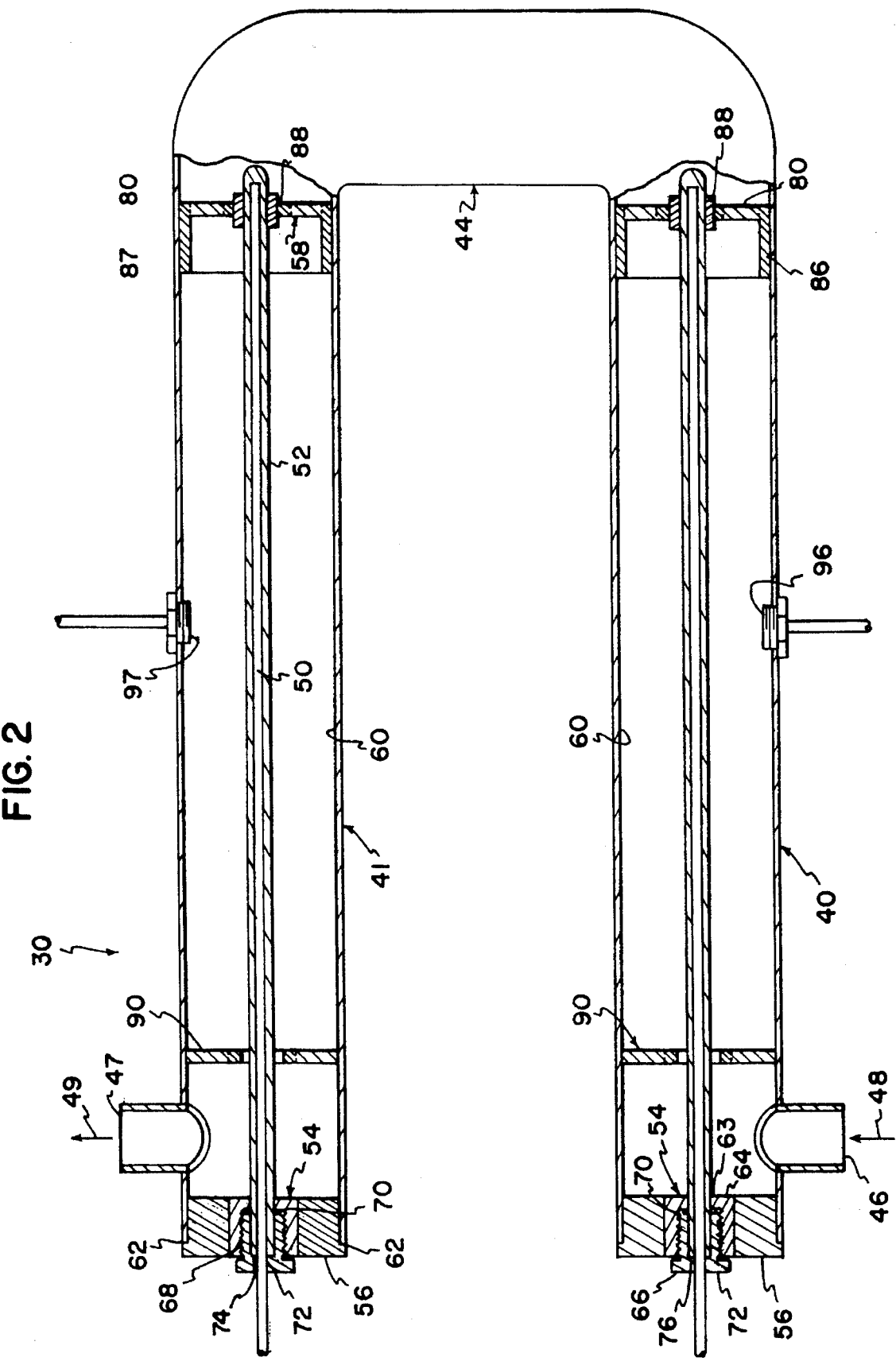
FIG. 2 is a broken away cross-sectional view of the disinfecting unit of the present invention.
Figure 4A:
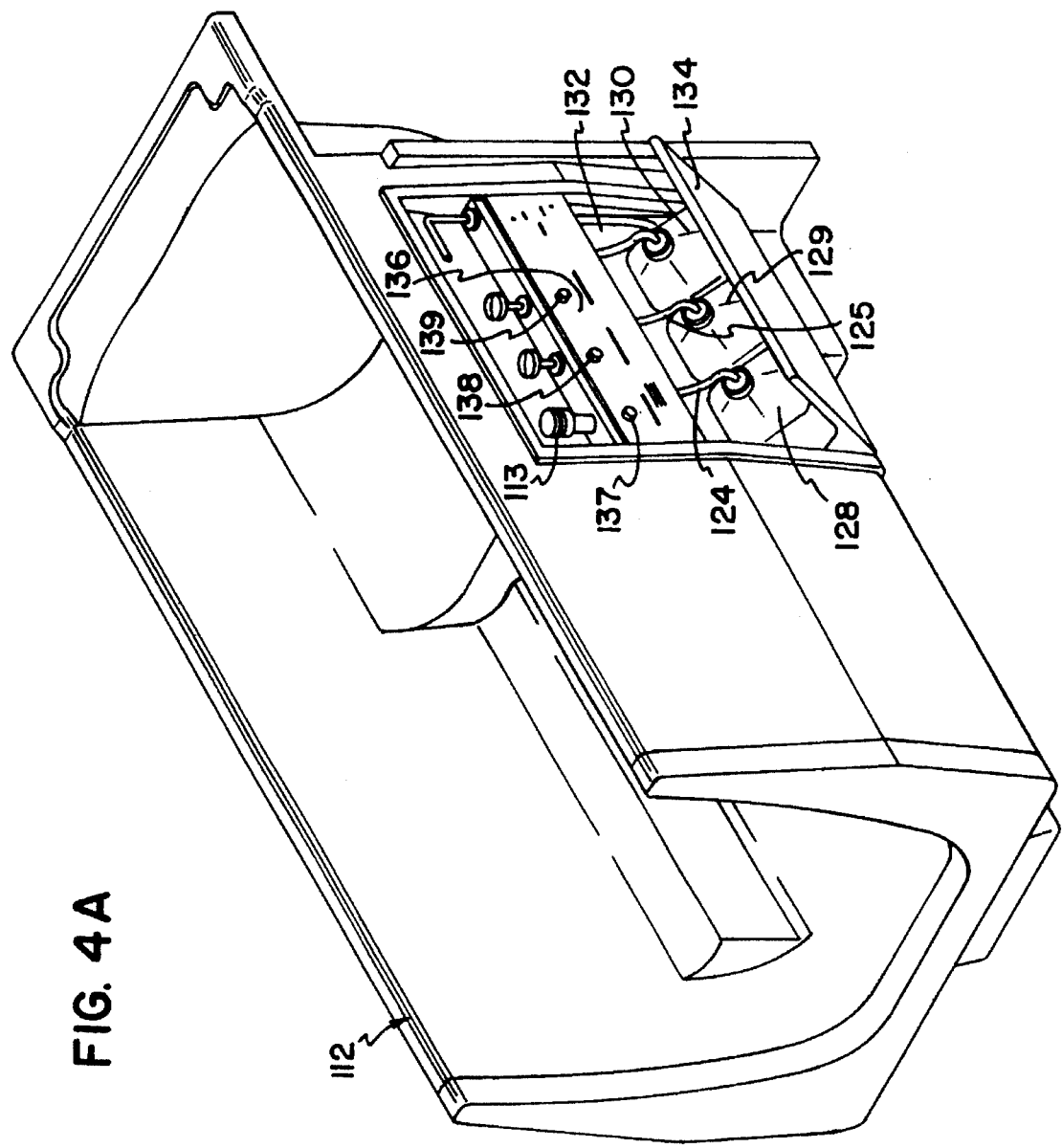
FIG. 4a is a perspective view of a bathtub employed with the present invention.

Turning now to FIG. 2, there is shown the disinfecting unit 30 of the invention in detail. The disinfecting unit 30 includes two chambers 40, 41 connected by an elbow section 44. The chambers 40, 41 are identical except that one chamber 40 includes an inlet port 46, for receiving water from the pump unit 26 while the other chamber 41 includes an exit port 47 for delivering water back to the bath tub 112 (FIG. 4a). Water flows through these chambers 40, 41 in the direction of the arrows 48, 49.

The chambers 40, 41 and elbow section 44 are preferably circular in cross section and are made of resilient polymers such as polyvinyl chloride (PVC) or other materials such as aluminum or stainless steel. The chambers 40, 41 are fastened to the elbow section 44 by conventional adhesion methods such as adhesive bonding with glues, welding or the like.

Each chamber 40, 41 includes an ultraviolet light bulb 50 housed in a watertight quartz sleeve 52, extending the length of each chamber 40, 41. The quartz sleeves 52 may be covered by a TEFLON® shrink tube which reduces deposits on the quartz sleeves 52 and catches broken particles from the quartz sleeve 52 (should either of the quartz sleeves 52 break) before the particles can enter the chambers 40, 41. The quartz sleeves 52, are held within each chamber 40, 41 at one end by nipples 54 within reducer bushings 56 and at the opposite ends (proximate to the elbow section 44) by holder baffles 58.

The reducer bushings 56 fit snugly against the inner circumferential walls 60 of the chambers 40, 41 and extend over the outer circumferential edges 62 of each chamber 40, 41. The nipples 54 are received in the central openings 63 of the reducer bushings 56. The reducer bushings 56 are joined to the nipple 54 and inner circumferential walls 60 by adhesive bonding with glue or the like.

Each nipple 54 includes a female threaded part 64 and a complementary male threaded part 66. The male threaded part 66 is then fastened to the female threaded part 64 in a screw-like manner, such that there is an aligned central cavity 68 with a diameter slightly larger then that of the quartz sleeve 52 to accommodate the quartz sleeve 52 therein in a frictional engagement. The junction of the female and male threaded parts 64, 66 serves as a seat for an O-ring 70. The O-ring 70 seals the central cavity 68, such that water can not reach the electronic components supplying power to the ultraviolet bulbs 50.

The male threaded part 66, at the end opposite the O-ring seat terminates in inwardly extending shoulders 72 which form a circular opening 74 with a diameter greater than the diameter of the ultraviolet bulb 50 but less than the diameter of the quartz sleeve 52. These shoulders 72 abut the open end 76 of the quartz sleeve 52 to restrain its movement, such that it can not be forced out of the chambers 40, 41 by water pressure. The ultraviolet light bulbs 50 extend through the openings 74, ultimately electrically connected to a voltage carrying line 158 (FIG. 5).

Figure 3B:
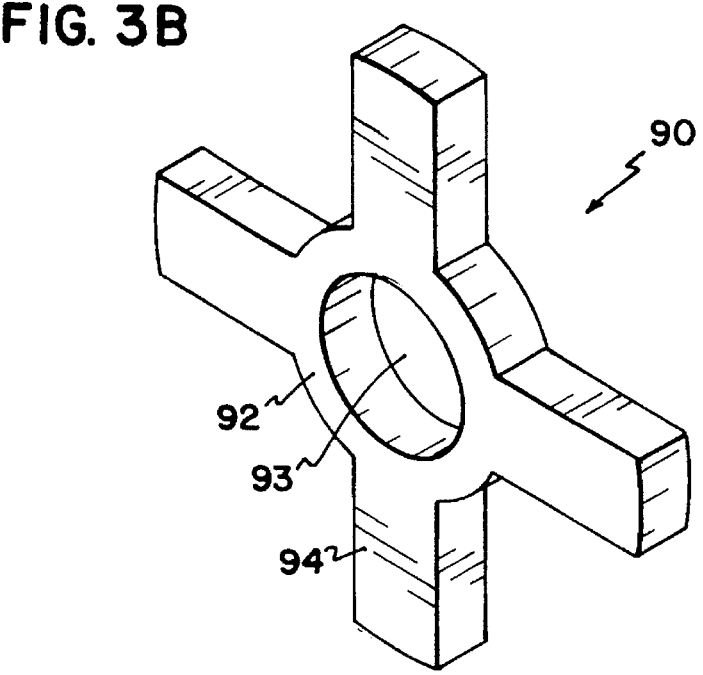
FIGS. 3a and 3b are front views of the baffles used in the disinfecting unit of the present invention.
Figure 3A:
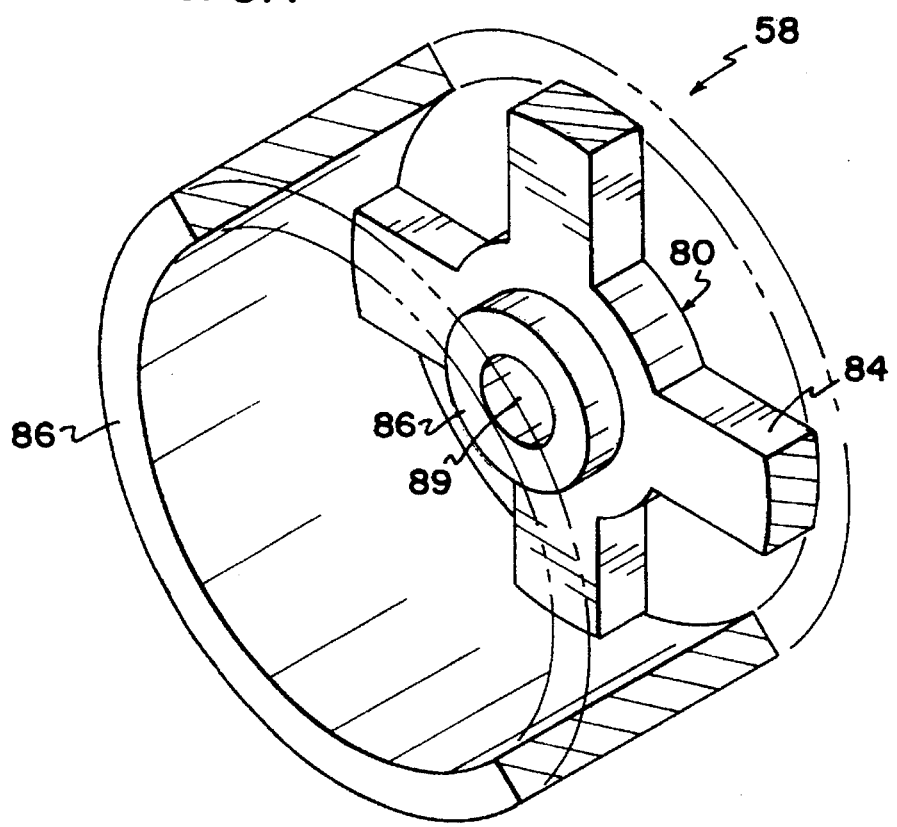

Turning also to FIG. 3a, at the opposite end of the chambers 40, 41, the ultraviolet bulbs 50 are retained within holder baffles 58. These holder baffles 58 include a body 80 having a central ring 82 and arms 84 extending radially in a circle from the central ring 82. The arms 84 terminate in a circumferential flange 86, which abuts and is attached to the inner circumferential walls 60 of the chamber 40, 41. A tube member 88 is mounted within the central ring 82. This tube member 88 has an opening 89 with an inner diameter slightly larger than the diameter of the quartz sleeves 52, to make frictional contact with it to firmly retain the quartz sleeve 52 within the chambers 40, 41, free from any movement.

Guide baffles 90, as also shown in FIG. 3b, are located within each chamber 40, 41 intermediate the reducer bushings 54 and the holder baffles 58. The preferred guide baffles 90 are similar to the body 80 of the holder baffles 58, as they include a central ring 92 with an opening 93 of a diameter greater than the quartz sleeve 52 and arms 94, extending radially in a circle therefrom. This central ring 92 serves as a guide for the quartz sleeve 52 when it is inserted into each chamber 40, 41, as the quartz sleeve 52 fits through the central ring 92 with sufficient space. The difference between the guide baffle 90 and the body 80 of the holder baffle 58, is that the arms 94 preferably extend such that they abut the inner circumferential walls 60 of the chambers 40, 41. Alternately, the arms 94 may terminate in a peripheral ring (not shown), which would be attached to the arms 94 and the inner circumferential walls 60 by adhesives such as glue or the like.

The radially extending arms 84, 94 of the holder and guide baffles 58, 90 enhance the turbulence in the water flow, in order that the water molecules containing the bacteria and other germs get as close as possible to the ultraviolet light bulbs 50, maximizing disinfection. The turbulence also inhibits the growth of bacteria and other germs. These radial arms 84, 94 are also relatively thin, such that the shadows of the arms and other baffle portions are minimized. As a result, ultraviolet treatment of the turbulent water is maximized.

The holder baffles 58 and the guide baffles 90 (including all components which comprise these baffles), are preferably made of polyvinyl chloride (PVC). Alternately, they could be made of urethane or stainless steel. The holder baffle 58 is preferably formed of separate pieces (body 80, circumferential flange 86 and tube member 88), but can also be formed as an integral member, this integral member made by machining, injection molding or other similar techniques. The guide baffle 90 is preferably an integral member. The baffles 58, 90 are preferably fastened together (if formed of separate components) and to the inner circumferential walls 60 of the chambers 40, 41 by adhesives such as glue or the like. Moreover, while only one of each of these baffles 58, 90 is employed in each chamber 40, 41, additional baffles 58, 90 could be placed into each chamber 40, 41 if desired.

The ultraviolet light bulbs 50 are designed to emit bacteria-lethal ultraviolet radiation at a wavelength of approximately 253.7 nanometers at a minimum intensity of 16,000 microwatt seconds per centimeter squared to disinfect and sterilize the bath water. When the quartz sleeves 52 become dirty, or the ultraviolet light bulbs 50 fail to emit the ultraviolet radiation at the proper wavelength or intensity, sensors 96, 97 located within each chamber 40, 41 will detect the changed conditions. Upon detection of a changed condition, specifically, a change in the intensity of the ultraviolet radiation, the sensor 96, 97 affected will send a signal to a pump control unit 140 (FIG. 5) on the apparatus 20, which will stop the pump unit 26. This typically occurs when either of the ultraviolet light bulbs 50 require replacement or cleaning or the quartz sleeve 52 requires cleaning.

The ultraviolet radiation intensity sensors 96, 97 are Part No. REM 302, available from Clean Water Systems, 2322 Marina Drive, P.O. Box 146, Klamath Falls, Oreg. 97601. While one sensor 96, 97 in each chamber 40, 41 is sufficient, additional sensors may be placed at additional locations in each chamber 40, 41, or in the elbow section 44, if desired.

Figure 4B:
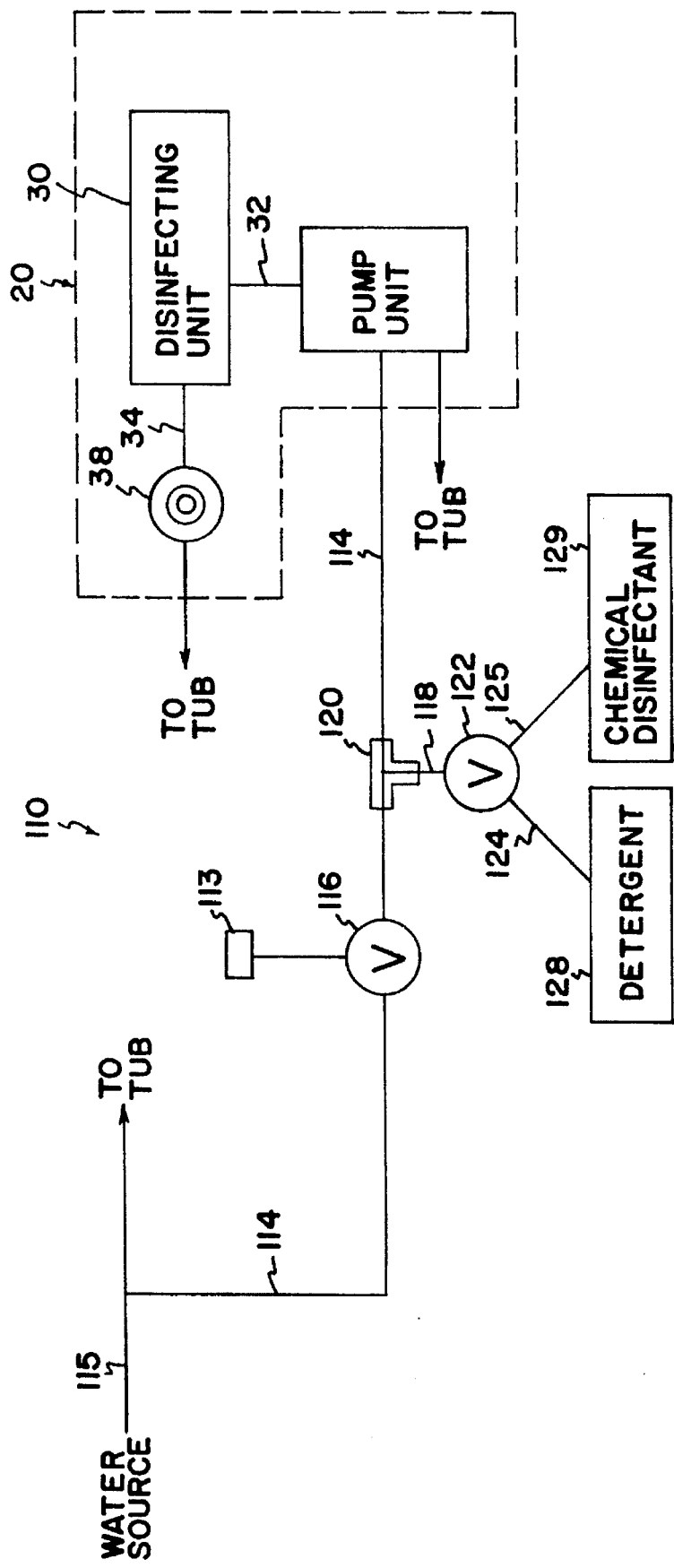
FIG. 4b is a diagram of the detergent injecting and disinfecting system of the present invention.

FIGS. 4a and 4b show a detergent injecting and chemical disinfection system 110 for the apparatus 20 and tub 112, shown with its door open. Along the side of the tub 112 is a control knob 113, which when pressed down activates the chemical disinfection and detergent injecting system 110. This system 110 includes a separate water line 114, branched from the line 115 that supplies water to the tub 112. This water line 114 includes a valve 116 and connects to a feed line 118, downstream from the valve 116 at a T-shaped connector 120. The feed line 118 supplies detergent or disinfectant to the water line 114 through a three way valve 122, which is manually activated depending on whether detergent or disinfectant is desired. The three way valve 122 is connected by sublines 124, 125 to a detergent storage tank 128 and a disinfectant storage tank 129, respectively.

The water line 114 terminates in a direct connection to the pump of the pump unit 26 of the apparatus 20. This direct connection to the pump of the pump unit 26 allows water with detergent or disinfectant to flood the pump unit 26, the conduit 24, the disinfecting unit 30, the inlet and outlet carrier lines 32, 34 and the jets 38 for cleansing or disinfecting the apparatus 20 and the tub 112.

The detergent storage tank 128, disinfectant storage tank 129 and auxiliary storage tank 130, for storing shampoo, bath oil, or the like are within a cabinet 132 having a tilt-down door 134, which is flush against the tub 112 when closed and the detergent injecting and disinfection system 110 is in operation. This portion of the tub 112 also includes a display panel 136 with Light Emitting Diode (LED) lamps 137, 138, 139, of yellow, green and red, indicating the status of the apparatus 20 (FIG. 1).

The detergent in the detergent storage tanks 128 is preferably POW-R-KLEEN, available from Apollo Corporation, P.O. Box 219, Somerset, Wis. 54025. The detergent attacks "hard" particles, i.e., calcium, in the water and keeps the components of the apparatus 20 clean. The disinfectant can be any commercially available disinfectant, such as SUR-CIDE PLUS, from Sween Corporation of North Mankato, Minn.

FIG. 5 details the electronics associated with the apparatus 20. The electronics include ultraviolet light bulbs 50 and ultraviolet sensors 96, 97 in communication with the pump control unit 140. The pump control unit 140 is in communication with the pump unit 26 and the display panel 124.

The pump control unit 140 includes a relay control 142, to which lines 146, 147 from each sensor 96, 97 are connected. The relay control 142 is in communication with the on/off switch 150, a circuit breaker 152, and a manual override switch 154. A voltage carrying line 158 extends within the pump control unit 140 from the LINE VOLTAGE. The circuit breaker 152 and the manual override switch 154 are along this voltage carrying line 158. The voltage carrying line 158 extends from the manual override switch 154 to the pump unit 26, supplying it with voltage, and continues past the pump unit 26, supplying voltage to the ballasts 160 and the sensors 96, 97. The ballasts 160 serve to convert conventional voltage from the line 158, to the energy necessary to power the ultraviolet bulbs 50.

The display panel 136 includes three light emitting diodes (LEDs) 137, 138, 139. These LEDs are colored yellow (Y), green (G) and red (R), indicative of the status of the apparatus.

Under proper operating conditions, the green LED 138 is on. This LED stays lit during the entire time of operation, provided conditions, i.e., ultraviolet radiation intensity, have not changed. Upon a changed condition, i.e., a drop in intensity of the ultraviolet radiation from either or both ultraviolet light bulbs 50, the sensor 96, 97 for the particular ultraviolet light bulb 50 will signal the display panel 136, such that the yellow LED 137 becomes lit, and remains lit, until the apparatus 20 is returned to a condition where it is functioning properly.

This signal from the sensor 96, 97 also reaches the relay control 142 which breaks the circuit by opening the manual override switch 154, which until this time has served as a pass-through for the voltage, traveling from the LINE VOLTAGE to the pump unit 26 and then to the ballasts 160.

As a result, the pump unit 26 and ultraviolet light bulbs 50 shut off, until attended to or the manual override switch 150 is activated.

When the manual override switch 154 is activated, a signal is sent to the relay control 142. The relay control 142 then signals the display panel 136, such that the red LED 139 becomes lit. Both the yellow LED 137 and the red LED 139 will remain lit until the manual override is terminated.

Operation of the apparatus begins as an operator turns on the on/off switch, activating the pump in the pump unit and providing power to the ultraviolet light bulb. The whirlpool jets have also been activated by turning on the on/off switch. The pump unit provides the requisite suction for pulling the water from the tub into the apparatus. The pump unit then pumps the water into the disinfecting unit in a whirlpool like turbulent stream.

In the disinfecting unit, the water, in a whirlpool stream, is exposed to ultraviolet bacteria-lethal radiation from the ultraviolet light bulbs, as it flows from the first chamber, through the elbow portion and then the second chamber. While in the first and second chambers, the turbulence of the water is enhanced as it passes through the baffles in the chambers. The treated water leaves the disinfecting unit through the exit port. Once through the outlet carrier line, the treated water is reintroduced to the bath tub through whirlpool jets. This cycle is repeated for the duration of the bath, when the pump unit is shut off by turning off the on/off switch, or until the pump is shut off by the sensor in the disinfecting unit, upon detection of a changed condition, which signals the relay control.

For example, a typical bath lasts approximately twelve minutes. If the tub holds eighty gallons of water and is pumped at forty gallons per minute for twelve minutes, all of the turbulent bath water will recirculate through the disinfecting unit every two minutes (six cycles during the bath), which is equivalent to a flow rate of thirteen gallons per minute. These recirculation cycles provide a cumulative exposure to the ultraviolet light, thus continuously destroying substantially all of the bacteria in the bath water.

The apparatus and tub are cleansed, at the end of each bath, and chemically disinfected, at the end of each day after all of the baths have been completed. The processes for cleansing and disinfecting are identical and begun when the operator activates the control knob by pressing it down. The water flows through the water line at approximately 40 psi, and through the valve (opened by pressing the control knob) and the T-shaped connectors. The operator manually adjusts the three way valve for either detergent or disinfectant, which enter the feed line and ultimately the water line at the T-shaped connector. The T-shaped connector serves as a venturi to create the suction necessary for the detergent or disinfectant from their respective storage tanks to be brought into the water line. The detergent or disinfectant saturated water then flows into the pump of the pump unit, ultimately flooding the entire apparatus. The operator then turns on the on/off switch, activating the pump unit and whirlpool jets, which forces clean solution through the apparatus and out to the tub for cleansing or disinfecting the apparatus 20 and the tub 112.

Figure 6:
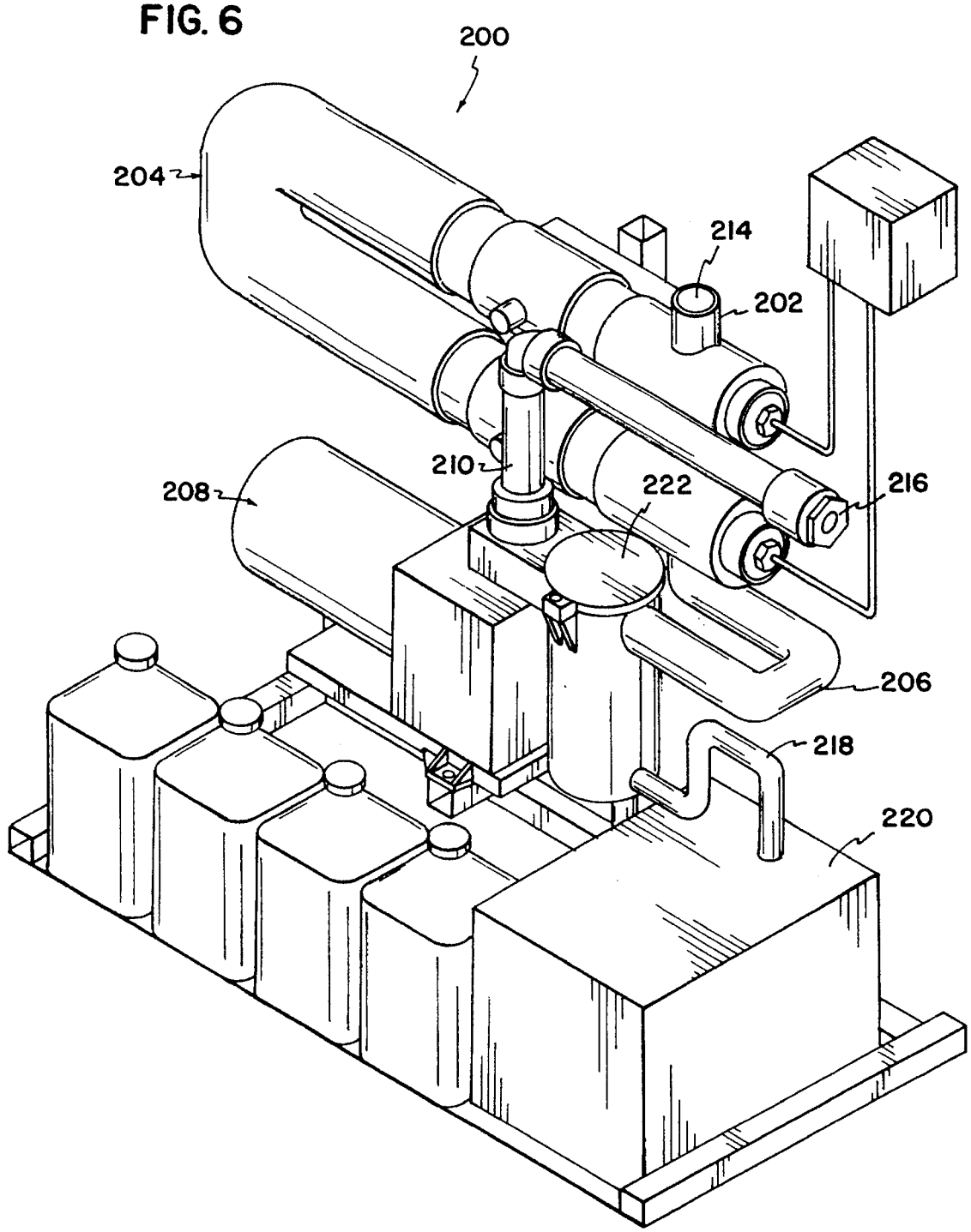
FIG. 6 is a perspective view of a second embodiment of the present invention.

FIG. 6 is a second embodiment of the apparatus 200 of the present invention. This embodiment is a portable device which can be used with existing bathtub structures. The apparatus 200 includes an inlet line 202, through which water moves into a disinfecting unit 204. Once treated in the disinfecting unit 204, the water enters a conduit 206, which transports it to a pump unit 208, where the water is then returned to the bathtub (not shown) through an outlet line 210. The pump unit 208 also provides suction necessary to pull the water into the disinfecting unit 204.

When use is desired, tubes can be attached to the inlet line 202 and the outlet line 210 at their respective ends 214, 216, and placed into a bathtub (not shown). Preferably, the tube leading to the inlet line 202 should be at a lower elevation than the tube from the outlet line 210 in order to create a circulation path for the bath water.

The disinfecting unit 204 is identical to the disinfecting unit 30 described in FIGS. 1 and 2 above. Additionally, the electronics associated with this apparatus 200 are identical to those for the apparatus 20 disclosed above (see FIG. 5).

The pump unit 208 is different from the pump unit 26 described above in that it may includes a self-priming pump, that must be supplied with approximately a half gallon of water. The pump unit 208 is connected by a line 218 to a holding tank 220. This holding tank 220 serves as a drain for water, which is forced out of the pump casing 222 prior to a new bath being run. Removal of this water from the pump casing 222 eliminates possible contamination of bath water from a previous bath, combining with the water of a successive bath, such that bacteria and infections from one bather are not spread to a later bather. When the holding tank 220 is full, it can be removed and emptied.

The pump unit 208 includes an electric motor and a pump. The pump unit 208 provides the requisite suction necessary to draw bath water into the disinfecting unit 204, and pumps with sufficient turbulence (preferably a "whirlpool" pattern). The pump unit 208 can also pump water from the apparatus 200 into the bathtub (not shown) at rates of approximately 30 gallons per minute to approximately 100 gallons per minute, with a rate of approximately 40 gallons per minute preferred. The preferred pump unit 208 is a self priming 0.75 horsepower MAXFLOW pump from Hayward Pool Products, Inc., 900 Fairmount Avenue, Elizabeth, N.J. 07207. Alternately, the pump unit 208 may be a one horsepower ULTRAFLOW or SUPERFLOW model pump from the Vico Products Manufacturing Co., Inc. of South Elmonte, Calif. If these ULTRAFLOW or SUPERFLOW pumps are used, the line 218 to the holding tank 220 is not necessary.

This second apparatus 200 operates similar to the apparatus 20 described above (FIGS. 1–5). The only difference is that the positions of the disinfecting unit 204 and the pump unit 208 have been switched. However, this pump unit 208 has sufficient suction and pumping capabilities to produce an identical bath water purifying circuit.

While particular embodiments of the invention have been shown, it will be understood, of course, that the invention is not limited thereto, since modifications may be made by those skilled in the art, particularly in light of the foregoing teachings. It is therefore, contemplated by the appended claims to cover any such modifications as incorporate those features which constitute the essential features these improvements within the true spirit and scope of the invention.

What is claimed is:

1. A bathing system comprising:
   a. a bathtub including means for filling before each bathing use and means for draining after each bathing use, said bathtub including an outlet jet;
   b. a pump;
   c. a suction port in communication with the pump;
   d. a disinfecting unit having a first end and a second end, the first end in communication with the pump, the disinfecting unit including at least one chamber, the chamber including means for disinfecting the water with ultraviolet radiation;
   e. means in communication with the second end of the disinfecting unit for delivering purified water to the outlet jet;
   f. a detergent storage tank; and
   g. a detergent injection system in communication with the pump for injecting detergent from the detergent storage tank for cleansing the bathtub after each bathing use.

2. The bathtub system of claim 1, wherein the suction port is located at a point below the outlet jet.

3. The bathing system of claim 1, additionally comprising a chemical disinfecting system in communication with the pump, for disinfecting the bathing system.

4. A bathing system, comprising:
   a bathtub for an individual person including a suction port and an outlet jet;
   a pump in fluid communication with said suction port;
   a disinfecting unit with first and second tubular chambers and an elbow section connecting said first and second tubular chambers together, said disinfecting unit having a first port in said first chamber and a second port in said second chamber, the first port being in communication with the pump, said first and second tubular chambers extending longitudinally between first ends and said elbow section, said disinfecting unit including first and second ultraviolet emitting bulbs extending longitudinally in said first and second tubular chambers and having free-standing ends and electrically-connecting ends, said first and second chambers having closure assemblies which close said first ends to water flow, said disinfecting unit also including means for electrically connecting through said closure assemblies said electrically-connecting ends to an electrical source and means for supporting said first and second ultraviolet emitting bulbs so that water can flow past the free-standing ends;
   means in communication with the second port of the disinfecting unit for delivering purified water to the outlet jet;
   a detergent storage tank and a detergent injecting system in communication with the pump;
   wherein water flows in said first port and past the free-standing end of said first ultraviolet emitting bulb to said elbow section, the water then flowing past the free-standing end of said second ultraviolet emitting bulb to said second port, so that in this way the water flows in unimpeded turbulence between the first and second ports to receive prolonged ultraviolet exposure without stagnating.

5. The bathing system in accordance with claim 4 including a quartz sleeve for each of said first and second ultraviolet emitting bulbs for containing said first and second ultraviolet emitting bulbs within said first and second chambers, respectively.

6. The bathing system in accordance with claim 5 including a shrink tube around each of said quartz sleeves for containing any pieces in case of breakage of said quartz sleeves.

7. The bathing system in accordance with claim 5 wherein each of said closure assemblies includes a female threaded part and a male threaded part, said male threaded part fastens to said female threaded part so that there is a cavity between them, each of said closure assemblies further including an O-ring fitting in said cavity to seal with said quartz sleeve.

8. A method for using a bathing system, said bathing system including a bathtub for an individual person, a disinfecting unit having an ultraviolet bulb, a pump, means for communicating water from said bathtub through said pump and said disinfecting unit and back to said bathtub, means for filling and draining said bathtub, and a detergent storage tank, comprising the steps of:

with bath water in the bathtub, cycling said bath water a plurality of times from said bathtub through said water communicating means and said disinfecting unit and back to said bathtub; and after draining said bath water, flowing fresh water from said bathtub filling means past said detergent storage tank to mix detergent with said fresh water and through said bathtub and said water communicating means to cleanse said bathtub and said water communicating means.

\* \* \* \* \*